United States Patent
Ikeda et al.

(10) Patent No.: US 6,549,374 B1
(45) Date of Patent: Apr. 15, 2003

(54) FLOATING-TYPE MAGNETIC HEAD WITH STRADDLE-MOUNTED SPRING-TYPE FLEXURE WITH PIVOT PROJECTION

(75) Inventors: Naoto Ikeda, Chiba (JP); Kenji Enomoto, Saitama (JP)

(73) Assignee: Sony Corporation (JP)

( * ) Notice: Subject to any disclaimer, the term of this patent is extended or adjusted under 35 U.S.C. 154(b) by 1100 days.

(21) Appl. No.: 08/796,737

(22) Filed: Feb. 6, 1997

Related U.S. Application Data

(63) Continuation of application No. 08/503,829, filed on Jul. 18, 1995, now abandoned.

(30) Foreign Application Priority Data

Jul. 29, 1994 (JP) .............................. 6-178720

(51) Int. Cl.[7] .............................................. G11B 21/16
(52) U.S. Cl. .................................................. 360/245.3
(58) Field of Search ............................ 360/103, 104, 360/245.3

(56) References Cited

U.S. PATENT DOCUMENTS

| | | | | |
|---|---|---|---|---|
| 5,079,660 A | * | 1/1992 | Yumura et al. | 360/104 |
| 5,124,865 A | * | 6/1992 | Atesmen et al. | 360/103 |
| 5,299,080 A | * | 3/1994 | Mizuno et al. | 360/103 |
| 5,299,081 A | * | 3/1994 | Hatch et al. | 360/103 |
| 5,339,208 A | * | 8/1994 | Yumura et al. | 360/104 |
| 5,473,488 A | * | 12/1995 | Gustafson et al. | 360/104 |

FOREIGN PATENT DOCUMENTS

| | | | | |
|---|---|---|---|---|
| JP | 63-304482 | * | 12/1988 | 360/103 |

* cited by examiner

*Primary Examiner*—David Davis
(74) *Attorney, Agent, or Firm*—Rader, Fishman & Grauer PLLC; Ronald P. Kananen, Esq.

(57) ABSTRACT

With the floating-type magnetic head, a load beam, working as an arm, and a flexure, working as a holder, are separately constructed. The flexure is attached to the base of the load beam by spot welding. An embossed (spherical concaved) portion is formed onto the middle of the displacement portion and is in contact with the base. Because the flexure is stiffer and stronger than a conventional cantilever spring-type flexure, it is possible. to prevent the displacement portion from being plastic-deformed even when there is a shock to the magnetic head when it is on standby. Further, the slider uses the embossed portion as a pivot, making the floating more stable.

10 Claims, 8 Drawing Sheets

FLOATING-TYPE MAGNETIC HEAD WITH STRADDLE-MOUNTED SPRING-TYPE FLEXURE WITH PIVOT PROJECTION

This application is a continuation of application Ser. No. 08/503,829 filed Jul. 18, 1995 now abandoned.

BACKGROUND OF THE INVENTION

1. Field of the Invention

The present invention relates to a magnetic head which is suitable for a hard disc device, a magneto-optical disc device, or other such devices.

2. Description of the Related Art

Currently, rewritable hard disc and magneto-optical disc devices employ a floating-type magnetic head in order to improve reliability. FIG. 1 illustrates the construction of a typical magneto-optical disc device 1, with the cabinet removed. The magneto-optical disc device 1 rotates a rewritable magneto-optical disc 11 using a spindle motor 12. An optical pickup 13 is positioned below the magneto-optical disc 11, and a floating-type magnetic head 14 is positioned above the disc 11.

The optical pickup 13 and the floating-type magnetic head 14 are mounted on a movable block 15, which is attached to a sliding portion 17 of a linear motor 16. Accordingly, the optical pickup 13 and the floating-type magnetic head 14 can move linearly along the radius of the magneto-optical disc 11. The optical pickup 13 receives light emitted from an optical block 18 via a prism 19 inside the movable block 15. The light reflected onto the magneto-optical disc 11 is received via the optical pickup 13 and the prism 19 by the optical block 18. The spindle motor 12, the linear motor 16, and the optical block 18 are fixed on a chassis 20.

FIG. 2 illustrates an underside view of the floating-type magnetic head 14 with a flexure 24 which works as an cantilever spring-type holder. With the magnetic head 14, a load beam 22 which works as a flexible arm, is attached to the top of a stabilizing piece 21, which stabilizing piece 21 is attached to the movable block 15 (FIG. 1). An opening 23 is formed at the root of the load beam 22 and determines an appropriate spring constant of the load beam 22. The stabilizing piece 25 of the flexure 24 is attached to the top of the load beam 22 by, for example, spot welding. A slider 28 is attached to a flat-spring-shaped displacement portion 27 which is built onto the underside of the stabilizing piece 25. A magnet 29 is positioned in the slider 28, and information is recorded onto the magnetic recording material of the optical-magneto disc 11 using a magnetic field which is generated by the magnet 29.

Referring to FIG. 3, three sides of the displacement portion 27 are cut with an appropriate width and length from the middle of the stabilizing piece 25, and one end of the displacement portion 27 is combined with the vertical portions 30 of the stabilizing piece 25. In other words, the displacement portion 27 forms a cantilever spring. Such displacement portion 27 is made thin from, for example, stainless steel, and has a predetermined spring constant. As shown in FIG. 4, a projection, for example, an embossed (spherical concaved) portion 31 is formed at the middle of the displacement portion 27. The embossed portion 31 is in contact with the base 36 of the load beam 22, and works as a pivot when the slider 28 is floating due to buoyancy F generated by moving air which is produced by the rotation of the optical-magneto-disc 11. The buoyancy F of the slider 28 is transmitted via the embossed portion 31 to the load beam 22, and the load beam 22 is thereby displaced due to the buoyancy F, making the floating of the slider stable.

Another floating-type magnetic head 14 (FIG. 1) has a straddle-mounted, spring-type flexure 32 as shown in FIG. 5. The flexure 32 is integrally molded together with the load beam 22 at the end of the load beam 22. A displacement portion 33 where the slider 28 is attached, is formed onto the middle of the flexure 32, and both sides of the displacement portion 33 are combined with the ring-shaped frame 35 by hinges 34A and 34B. Both sides of the frame 35, each of which forms a right angle to each of the hinges 34A and 34B, respectively, are combined with the load beam 22 by hinges 34C and 34D. In other words, the displacement portion 33 is formed into a flat straddle-mounted spring. As shown in FIG. 6, the displacement portion 33 is terraced downward with respect to a base 36 and is formed thick by half etching and so on, so that the displacement portion 33 does not interfere with the frame 35 when the displacement portion 33 is rotated due to the buoyancy F of the slider 28.

As described above, only the one end of the cantilever spring-type flexure 24 (FIG. 4) is combined with the stabilizing piece 25 by the vertical portions 30. Accordingly, with a non-contact start-and-stop-type device, when there is a shock, in particular a vertical shock to the load beam 22 in an aslant rising position on standby, the vertical portions 30 or the displacement portion 27 may be accidentally plastically-bent.

Further, because the straddle-mounted spring-type flexure 32 (FIG. 6) is integrally molded together into the load beam 22, the shape of the flexure 32 is determined according to the shape of the load beam 22. For example, it is impossible to form the flexure 32 which is wider than the load beam 22. Moreover, in order to establish the spring constant of the flexure 32 at a predetermined value, the half etching by which the base 36 of the load beam 22 is thinly formed, takes much time and labor. Moreover, the slider 28 does not have a pivot and the buoyancy F is not effective at one point of the slider 28, and this makes the floating unstable.

OBJECT AND SUMMARY OF THE INVENTION

An object of the present invention is to provide an improved floating-type magnetic head which increases strength and durability against shock, making the floating of the slider more stable.

In one aspect, a floating-type magnetic head according to the present invention is comprised of an arm, a slider, a magnet, and a holder. The arm is positioned slidably along the radius direction of a disc. The slider is attached to the top of the arm and floats due to the movement of air produced by rotation of the disc. The magnet is mounted on the slider. The slider is attached displaceably to the arm by the holder. With such magnetic head, a straddle-mounted spring-type displacement portion is formed on the holder which is constructed separately from the arm. A projection is built on the displacement portion so as to be in contact with the arm in order to work for a pivot of the displacement portion.

In another aspect, a floating-type magnetic head according to the present invention is comprised of an arm, a slider, a magnet, and a holder. The arm is positioned slidably along the radius direction of a disc. The slider is attached to the top of the arm and floats due to the movement of air produced by rotation of the disc. The magnet is mounted on the slider. The slider is attached displaceably to the arm by the holder. With such magnetic head, a straddle-mounted spring-type displacement portion is formed on the holder which is constructed separately from the arm. A projection is built onto the arm so as to be in contact with the displacement portion in order to work as a pivot for the displacement portion.

In still another aspect, a floating-type magnetic head according to the present invention is comprised of an arm, a slider, a magnet, and a holder. The arm is positioned slidably along the radius direction of a disc. The slider is attached to the top of the arm and floats due to the movement of air produced by rotation of the disc. The magnet is mounted on the slider. The slider is attached displaceably to the arm by the holder. With such magnetic head, a straddle-mounted spring-type displacement portion is formed onto the holder which is integrally molded together with the arm. A projection is built onto the displacement portion, in order to work as a pivot of the displacement portion. A contact portion is attached to the arm so as to be in contact with the projection.

In yet another aspect, a floating-type magnetic head according to the present invention is comprised of an arm, a slider, a magnet, and a holder. The arm is positioned slidably along the radius direction of a disc. The slider is attached to the top of the arm and floats due to the movement of air produced by rotation of the disc. The magnet is mounted on the slider. The slider is attached displaceably to the arm by the holder. With such magnetic head, a straddle-mounted spring-type displacement portion formed on the holder which is integrally molded together with the arm, and a contact portion with a projection which works as a pivot for the displacement portion, are attached to the arm.

Preferred embodiments of the invention include the following features. Referring to FIG. 7, with the floating-type magnetic head 14 according to claim 1 of the present invention, a load beam 22, working as an arm, and a flexure 40, working as a holder, are separately constructed from stainless steel. The flexure 40 is attached to the base 36 of the load beam 22 by, for example, spot welding. As shown in FIG. 8, a projection, for example, an embossed (spherical concaved) portion 44 is formed onto the middle of the displacement portion 41 and is in contact with the base 36 as shown in FIG. 9.

With the floating-type magnetic head 14, because the flexure 40 is stiffer and stronger than a conventional cantilever spring-type flexure 24 (FIG. 2), it is possible to prevent the displacement portion 41 from being bent even when there is a shock to the magnetic head 14 when it is on standby. Further, the slider 28 uses the embossed portion 44 as a pivot, making the floating more stable.

Additional objects and advantages of the present invention will be apparent from the following detailed description of a preferred embodiment thereof, which is best understood with reference to the accompanying drawings.

DESCRIPTION OF THE PREFERRED EMBODIMENT

A preferred embodiment according to the present invention is described below with reference to the drawings. In the following description, the same reference numbers are employed to designate like portions described above and no additional detailed description is made.

Figure 1:
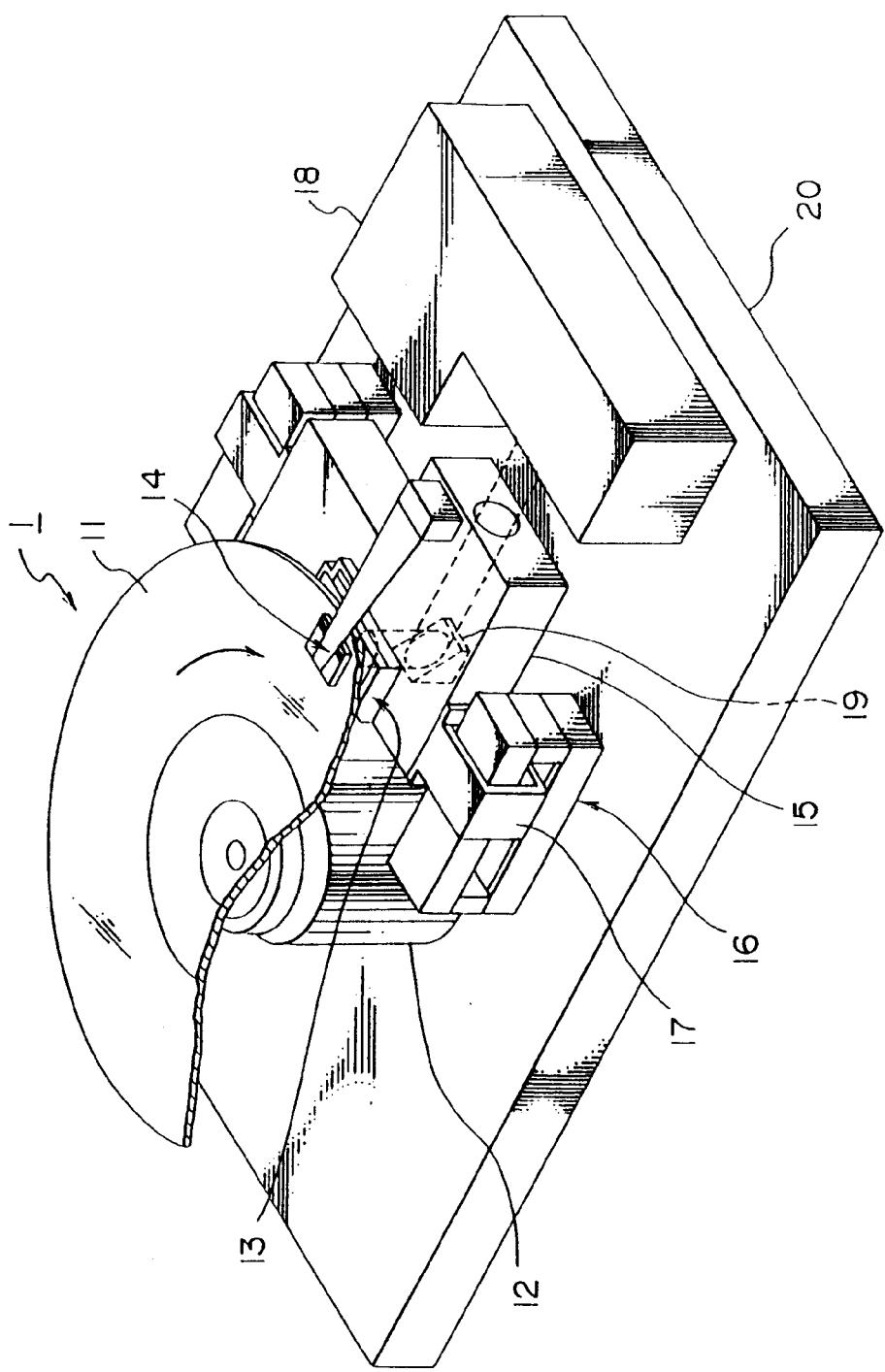
FIG. 1 is a view showing a construction of a typical optical-magneto disc device 1 in the prior art.
Figure 2:
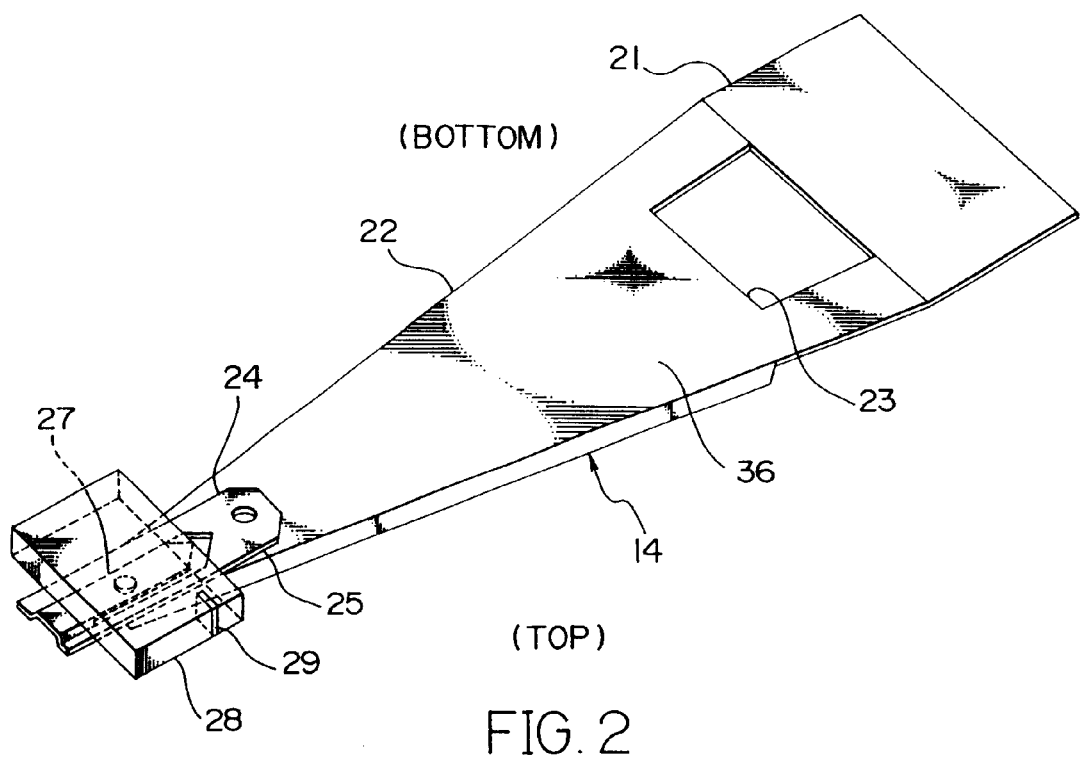
FIG. 2 is a view showing a magnetic head 14 with an cantilever spring-type flexure 24 in the prior art, as seen from its underside.
Figure 3:
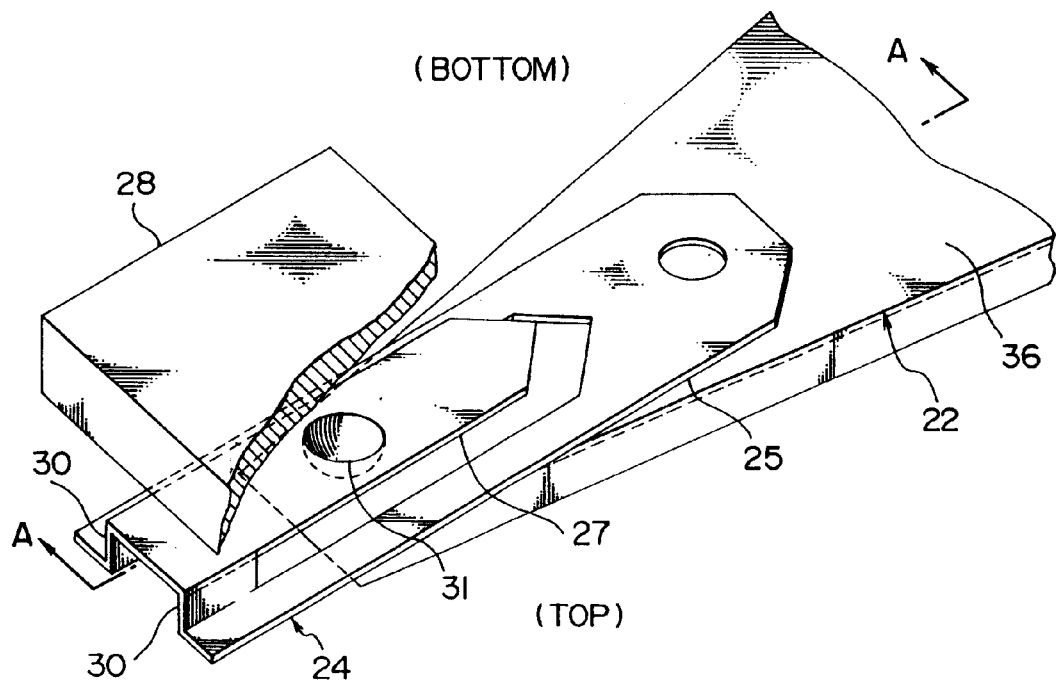
FIG. 3 is a view showing a construction a flexure 24 in the prior art.
Figure 4:
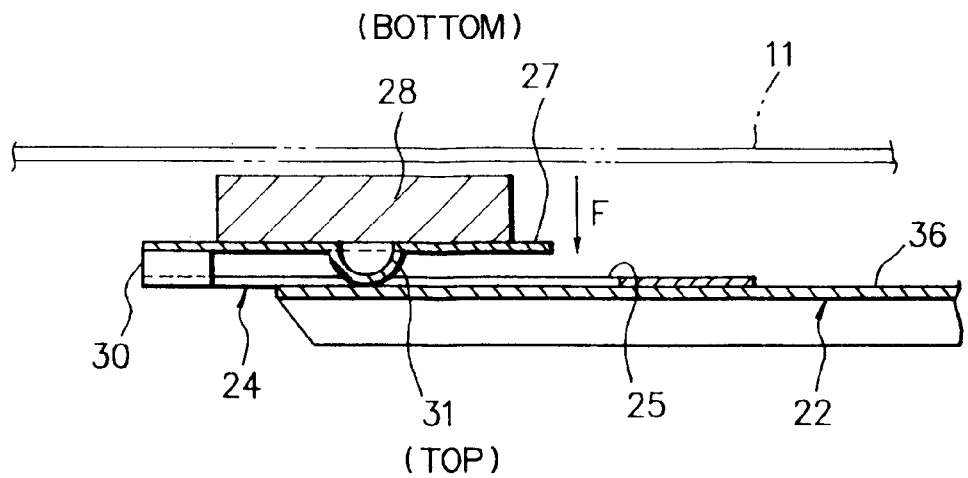
FIG. 4 is a cross-sectional view from line A—A of FIG. 3.
Figure 5:
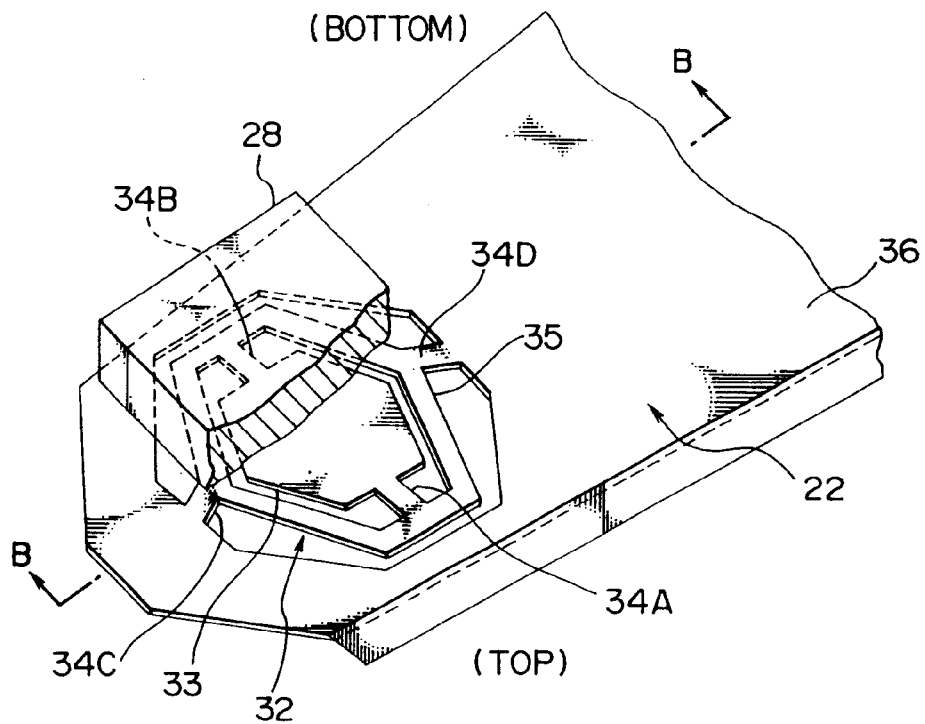
FIG. 5 is a view showing a construction of a straddle-mounted spring-type flexure 32 in the prior art.
Figure 6:
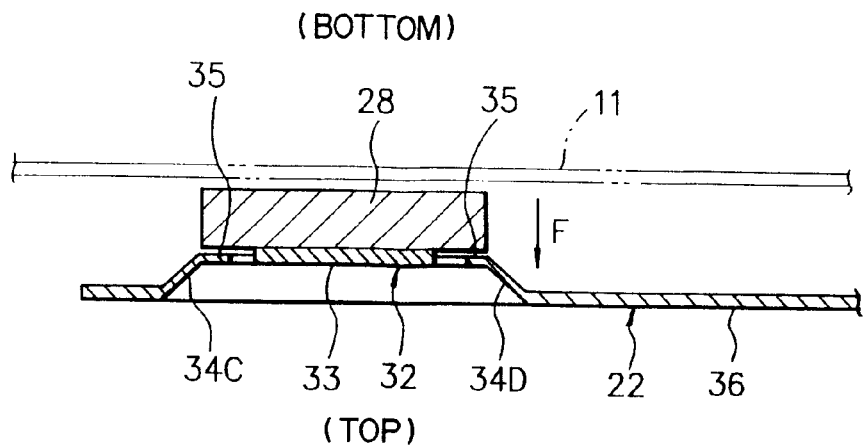
FIG. 6 is a cross-sectional view from line B—B of FIG. 5.
Figure 7:
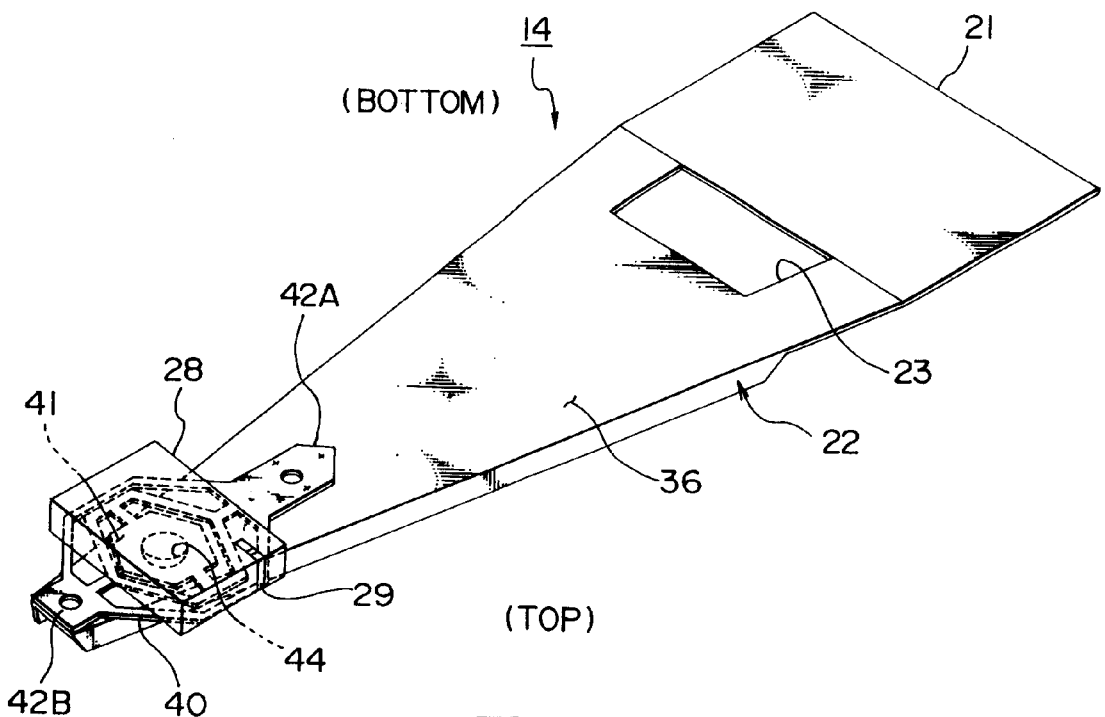
FIG. 7 is a view showing a construction of a floating-type magnetic head 14 according to the present invention.
Figure 8:
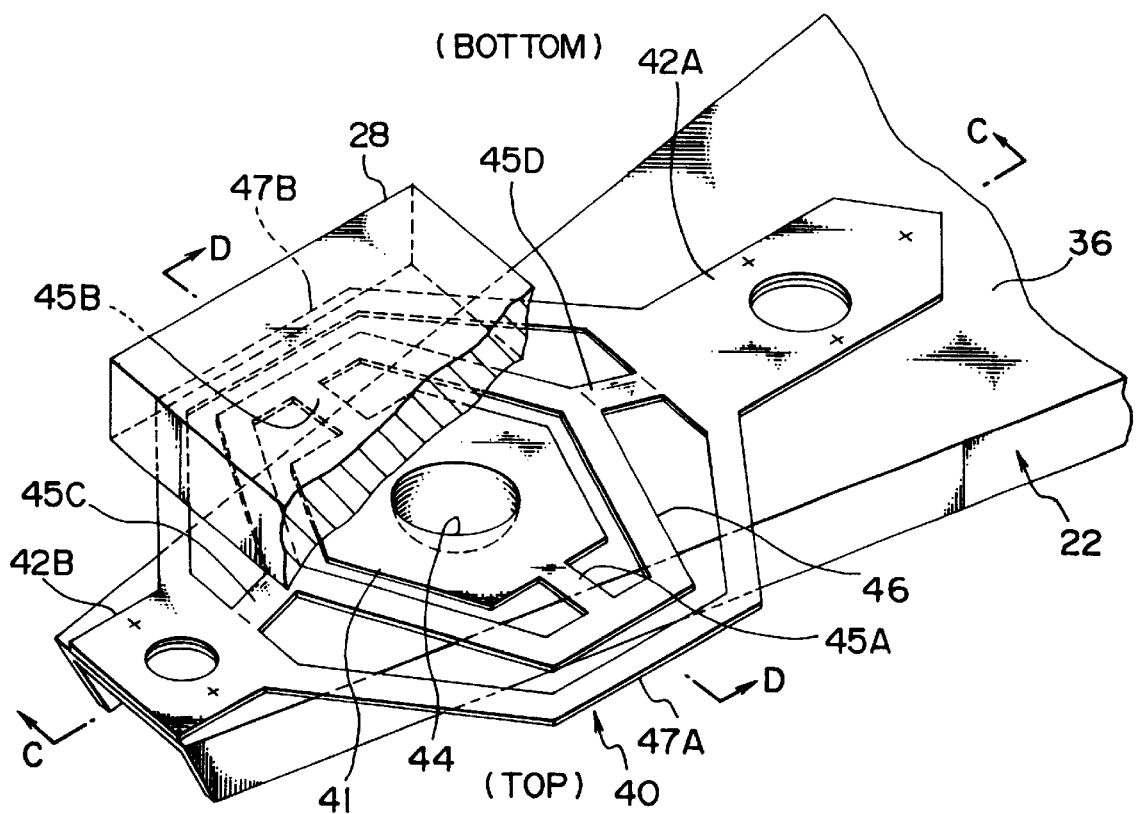
FIG. 8 is a view showing a construction of a flexure 40 of the present invention.

FIG. 7 illustrates a construction of a floating-type magnetic head 14 according to embodiment of the present invention, as seen from its underside. In the floating-type magnetic head 14, a load beam 22, working as an arm, and a flexure 40, working as a holder, are each separately constructed from stainless steel. With the flexure 40, stabilizing pieces 42A and 42B are formed on both sides of a displacement portion 41, and are attached to the base 36 of the load beam 22 by, for example, spot welding. A slider 28 is attached to the underside of the displacement portion 41, and a magnet 29 is positioned appropriately in the slider 28. As shown in FIG. 8, a projection, for example, an embossed (spherical concaved) portion 44, which works as a pivot for the slider 28, is formed into the middle of the displacement portion 41 so as to be in contact with the base 36 of the load beam 22.

Hinges 45A and 45B combine both sides of the displacement portion 41 with a ring-shaped frame 46. Both sides of the frame 46, each of which forms a right angle to each of the hinges 45A and 45B, respectively, are combined with the stabilizing pieces 42A and 42B by hinges 45C and 45D. Ring-shaped position regulators 47A and 47B are positioned on the outside of the frame 46 so as to be able to come in contact with the surface of the slider 28 at the side of the position regulators 47A and 47B. The displacement portion 41 is terraced with respect to the frame 46 by half etching, and the position regulators 47A and 47B are terraced with respect to the frame 46. The flexure 40 has an appropriate thickness and a predetermined spring constant. Accordingly, the displacement portion 41 is displaceable in all directions.

Figure 9:
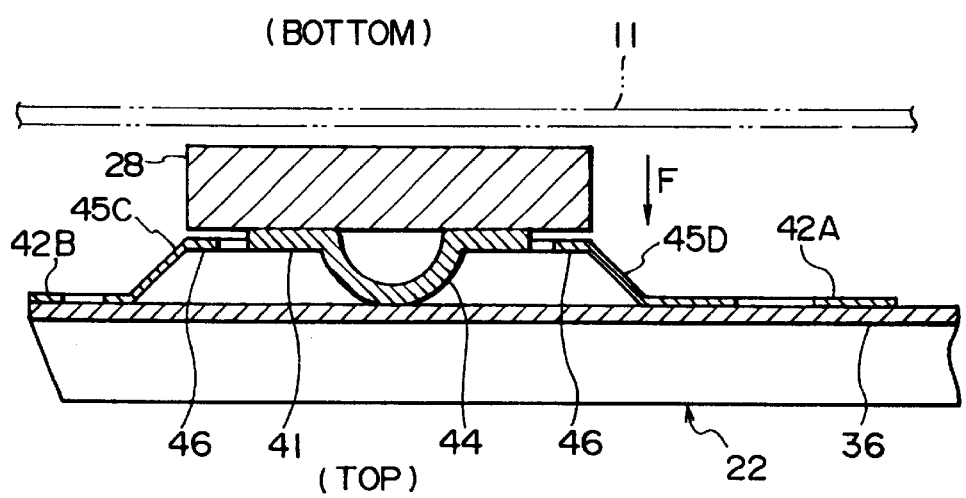
FIG. 9 is a cross-sectional view from line C—C of FIG. 8.

As shown in FIG. 9, when buoyancy F acts on the slider 28 due to the movement of air which is produced by rotation of the optical-magneto disc 11, the buoyancy F acts on the base 36 of the load beam 22 via the displacement portion 41 and the embossed portion 44, and the load beam 22 is bent flexibly, establishing the distance between the slider 28 and the optical-magneto-disc 11 at the specified value. In this situation, a recording operation can be performed normally. Even when the surface of the optical-magneto disc 11 is undulated or uneven, or when dust sticks to the surface of the optical-magneto disc 11, the displacement portion 41, in other words, the slider 28, can be displaced in all directions using the embossed portion 44 as a pivot, making the floating more stable, and thereby improving the tracking operation for the recording face of the optical-magneto disc 11. Further, because the floating-type magnetic head 14 is a straddle-mounted spring-type, the stiffness and strength are improved. Even when there is a shock to the side of the slider 28 in a rising position on standby, it is possible to prevent the displacement portion 41 of the flexure 40, the frame 46, the hinges 45A to 45D, and the position regulator 47A and 47B, from being bent.

Figure 10:
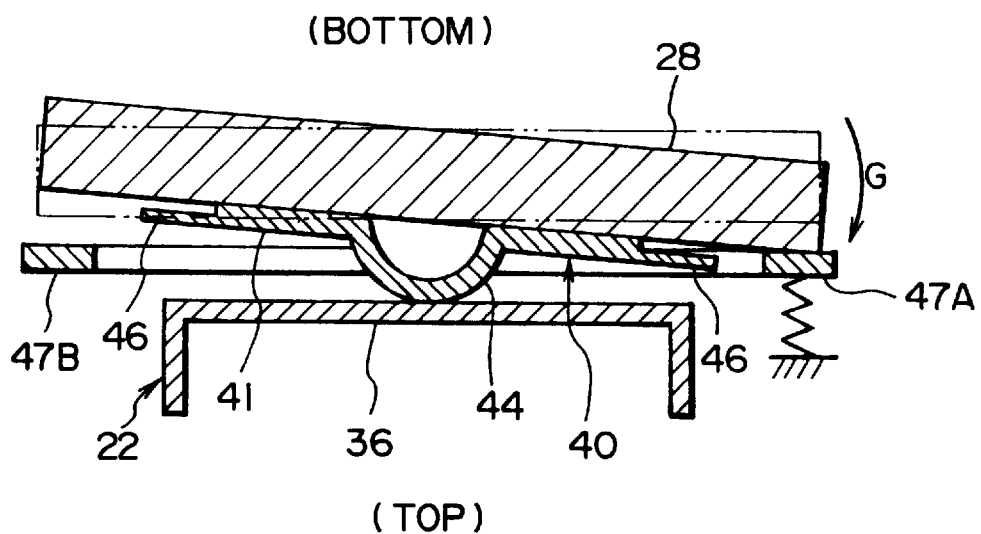
FIG. 10 is a cross-sectional view from line D—D of FIG. 8.

Referring to FIG. 10, with the flexure 40 in this embodiment, the flexible position regulators 47A and 47B are positioned on the outside of the displacement portion 41 and the frame 46. Accordingly, for example, when there is a horizontal shock or pressure to the slider 28 being assembled or in a standby condition at a time when the user is not using the device and a force G works on the slider 28 rotating it, the slider 28 comes into contact with the position regulator 47A or 47B and is prevented from being over-rotated. This prevents the displacement portion 41 and the other portions from being bent. Further, with the flexure 40 for this floating-type magnetic head 14, the load beam 22 is constructed separately from the flexure 40, and the shape of the flexure 40 is determined independently of the shape of the load beam 22, thus making the adjustable range of the spring constant wider.

Figure 11:
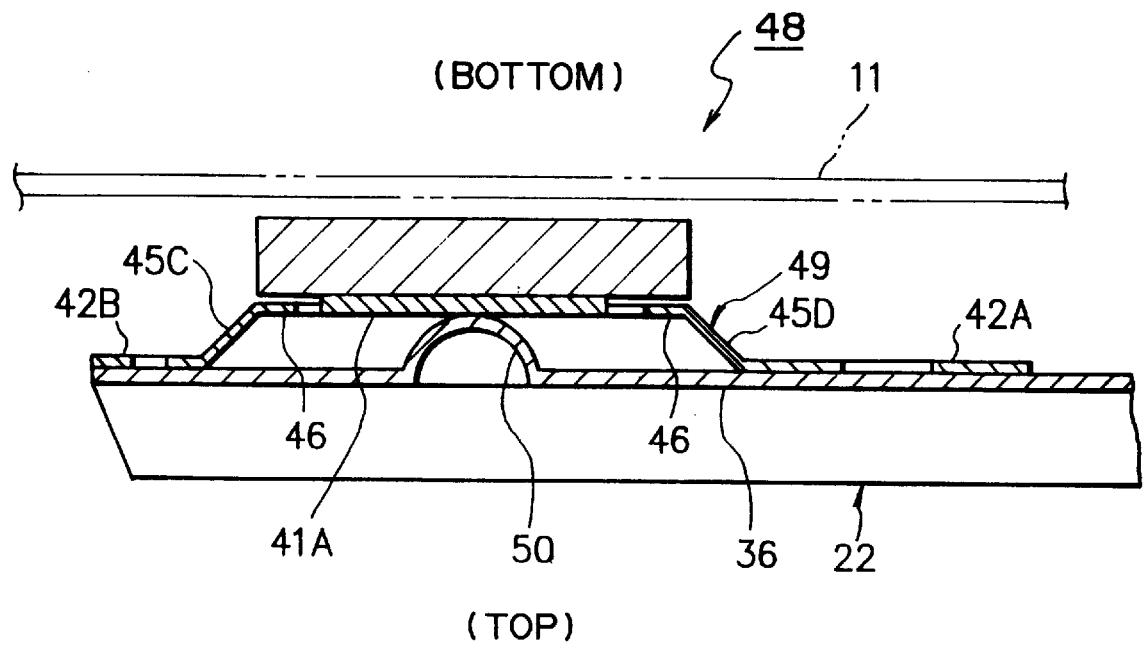
FIG. 11 is a view showing a construction of a floating-type magnetic head 48 according to the present invention.

FIG. 11 shows a construction of another floating-type magnetic head 48 according to the present invention. With this floating-type magnetic head 48, the displacement portion 41A is formed flat, and the embossed portion 50 formed on the base 36 of the load beam 22 is in contact with the middle of the displacement portion 41A. With the floating-type magnetic head 48, the other portions are constructed in a fashion similar to the floating-type magnetic head 14. Such floating-type magnetic head 48 can be used in a device in which the flexure 49 is too thin to be embossed.

Figure 12:
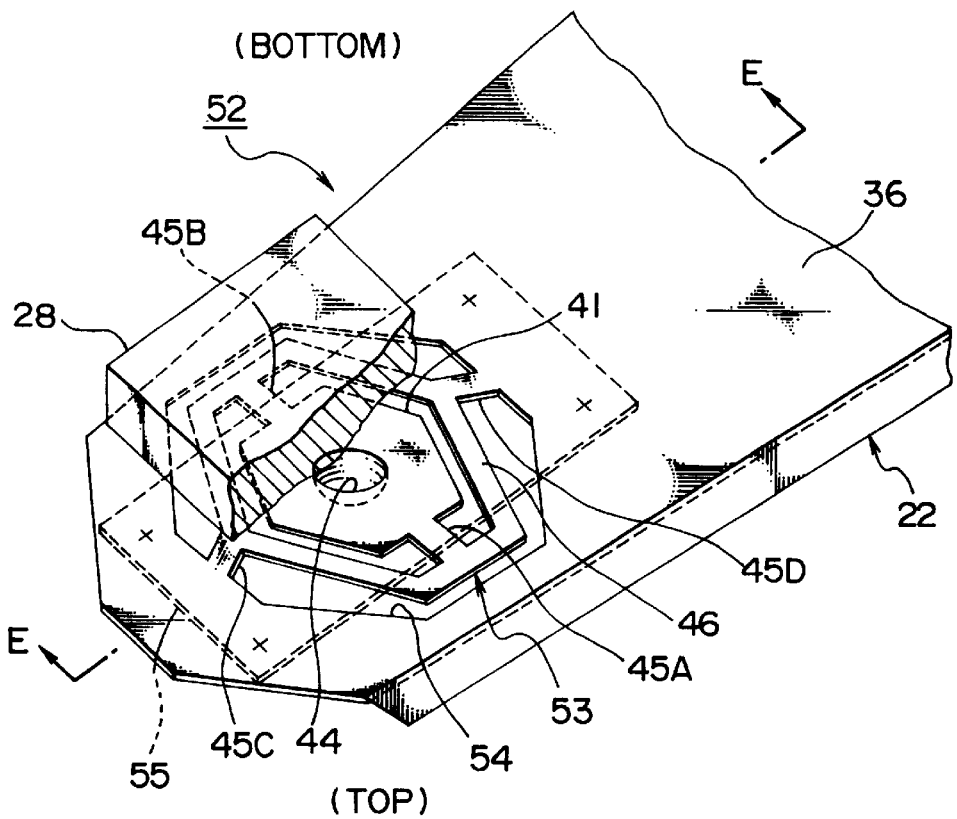
FIG. 12 is a view showing a construction of a floating-type magnetic head 52 according to the present invention.
Figure 13:
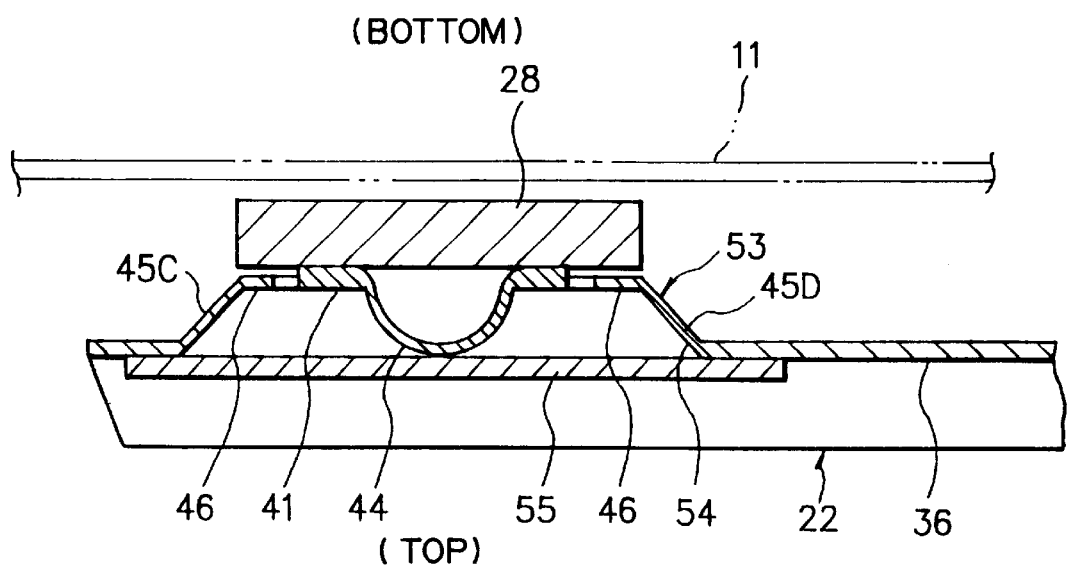
FIG. 13 is a cross-sectional view from line E—E of FIG. 12.

FIG. 12 shows a construction of another floating-type magnetic head 52 according to claim 3. With this floating-type magnetic head 52, the flexure 53 and the load beam 22 are integrally molded together. As shown in FIG. 13, an embossed portion 44 is formed at the middle of the displacement portion 41 of the flexure 53. An opening 54 at the base 36 below the flexure 53 is bridged with a plate-shaped contact portion 55 which is attached to the upper side of the base by, for example, spot welding. The embossed portion 44 is in contact with the contact portion 55. With this floating-type magnetic head 52, the portions other than those described above and the position regulators 47A and 47B, are constructed in a fashion similar to the floating-type magnetic head 14 shown in FIG. 7. Such floating-type magnetic head 52 can be constructed simply because the opening 54 is bridged with the plate-shaped contact portion 55.

Figure 14:
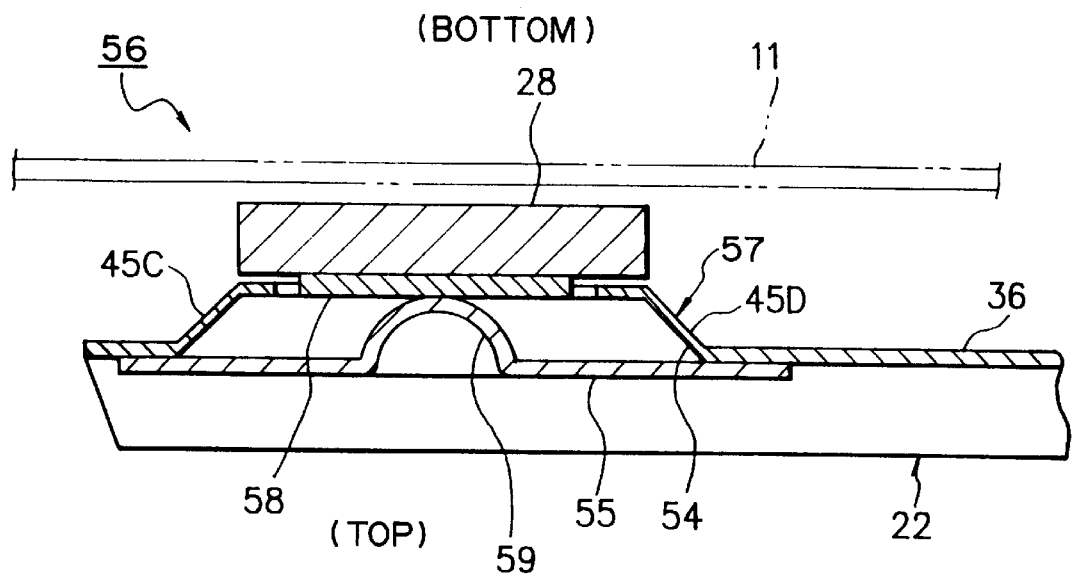
FIG. 14 is a view showing a construction of a floating-type magnetic head 56 according to the present invention.

FIG. 14 shows a construction of another floating-type magnetic head 56 according to claim 4. With this floating-type magnetic head 56, the flexure 57 and the load beam 22 are integrally molded together, in a fashion similar to the floating-type magnetic head 52 shown in FIG. 12. A displacement portion 58 of the flexure 57 is formed flatly, and an embossed portion 59, which is in contact with the displacement portion 58, is formed into a contact portion 55. The other portions are constructed in a fashion similar to the floating-type magnetic head 52 described above. Such floating-type magnetic head 56 can be used in a device in which the displacement portion 58 cannot be embossed due to the thickness of the flexure 57.

Figure 15:
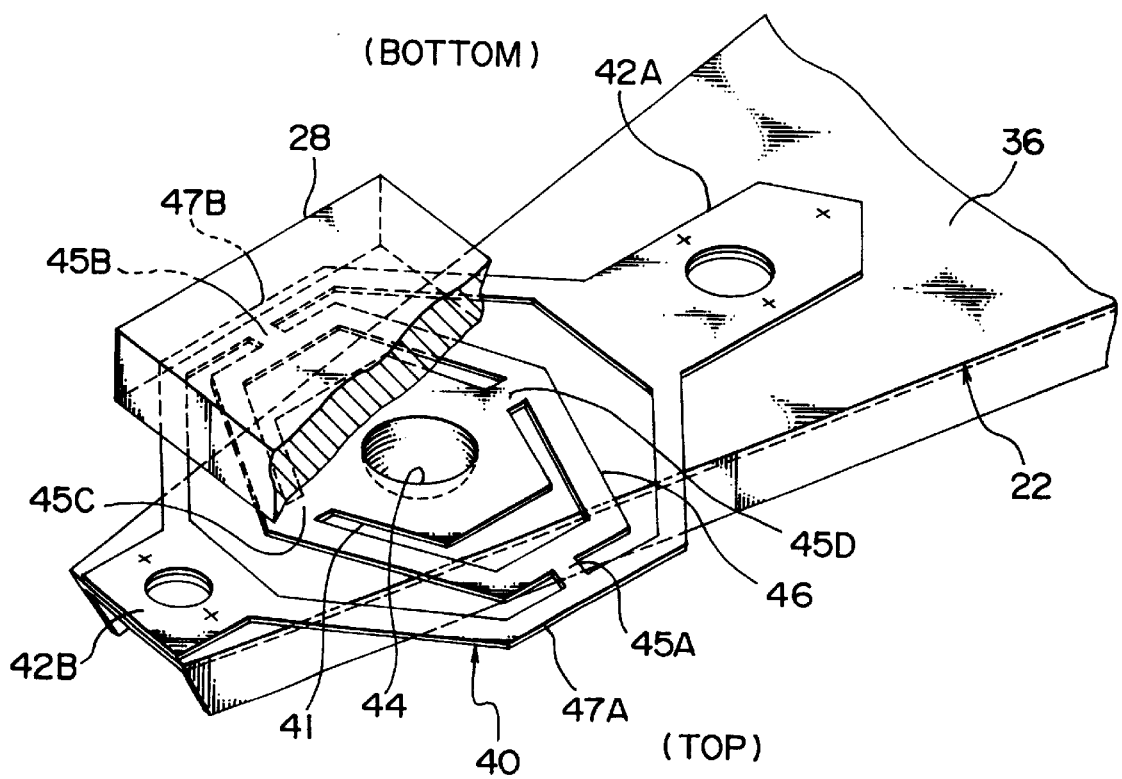
FIG. 15 is a perspective view showing modification of flexure 40 according to the present invention.

In the embodiments described above, although the frame 46 is combined with the position regulator 47A or the base 36 by the hinges 45C and 45D, which are formed along the long side of the load beam 22, and although the displacement portion 41 is combined with the frame 46 by the hinges 45A and 45B which form right angles to the hinges 45A and 45B, respectively, as shown in FIG. 15, it is also possible for the frame 46 to be combined with the position regulator 47A or the base 36 by the hinges 45C and 45D, which are formed along the width direction of the load beam 22, and for the displacement portion 41 is combined with the frame 46 by the hinges 45A and 45B, which form right angles with the hinges 45A and 45B, respectively.

As described above, a floating-type magnetic head according to the present invention is comprised of an arm, a slider, a magnet, and a holder. The arm is positioned slidably along the radius direction of a disc. The slider is attached to the top of the arm and floats due to the movement of air produced by rotation of the disc. The magnet is mounted on the slider. The slider is attached displaceably to the arm by the holder. With such a magnetic head, a straddle-mounted spring-type displacement portion is formed on the holder which is constructed separately from the arm. A projection is built on the displacement portion so as to be in contact with the arm in order to work for a pivot of the displacement portion.

With the present invention, it is possible to prevent the holder from being bent even when there is a shock to the magnetic head because the holder is stiffer and stronger than a conventional cantilever spring-type holder. Further, an embossed portion works as a pivot for the slider, making the floating stable and improving the tracking operation for a medium, in a fashion similar to the cantilever spring-type holder.

A floating-type magnetic head according to the present invention is comprised of an arm, a slider, a magnet, and a holder. The arm is positioned slidably along the radius direction of a disc. The slider is attached to the top of the arm and floats due to the movement of air produced by rotation of the disc. The magnet is mounted on the slider. The slider is attached displaceably to the arm by the holder. With such magnetic head, a straddle-mounted spring-type displacement portion is formed on the holder which is constructed separately from the arm. A projection is built onto the arm so as to be in contact with the displacement portion in order to work as a pivot for the displacement portion.

Accordingly, such floating-type magnetic head can be used in a device in which the holder cannot be embossed due to the thickness of the holder, still achieving stable floating.

A floating-type magnetic head according to the present invention is comprised of an arm, a slider, a magnet, and a holder. The arm is positioned slidably along the radius direction of a disc. The slider is attached to the top of the arm and floats due to the movement of air produced by rotation of the disc. The magnet is mounted on the slider. The slider is attached displaceably to the arm by the holder. With such magnetic head, a straddle-mounted spring-type displacement portion is formed onto the holder which is integrally molded together with the arm. A projection is built onto the displacement portion, in order to work as a pivot of the displacement portion. A contact portion is attached to the arm so as to be in contact with the projection.

Accordingly, because the pivot for the slider can be embossed in the floating-type magnetic head in which a straddle-mounted spring-type holder is integrally molded together with the arm, the floating of the slider is improved.

A floating-type magnetic head according to claim 4 is comprised of an arm, a slider, a magnet, and a holder. The arm is positioned slidably along the radius direction of a disc. The slider is attached to the top of the arm and floats due to the movement of air produced by rotation of the disc. The magnet is mounted on the slider. The slider is attached displaceably to the arm by the holder. With such magnetic head, a straddle-mounted spring-type displacement portion formed on the holder which is integrally molded together with the arm, and a contact portion with a projection which works as a pivot for the displacement portion, are attached to the arm.

Accordingly, with the floating-type magnetic head in which the holder cannot be concave due to its thickness and in which the straddle-mounted spring-type holder is integrally molded together with the arm, a pivot for the slider can be made and the floating of the slider is improved.

It will be obvious to those having skill in the art that many changes may be made in the above-described details of the preferred embodiment of the present invention. The scope of the present invention, therefore, should be determined by the following claims.

What is claimed is:

1. A floating magnetic head having an arm which is positioned slidably along a radial direction of a disc, a slider which is attached to said arm and which floats above a surface of the disc due to a movement of air produced by rotation of the disc, a magnet mounted on the slider, and a holder by which said slider is attached displaceably to the arm, comprising:
   a straddle-mounted spring displacement portion which is formed on said holder, said straddle-mounted spring displacement portion being separate from said arm; and
   a projection extending from one of said displacement portion and said arm, said projection being in contact with the other of said displacement portion and said arm and providing a pivot for said displacement portion.

2. A floating magnetic head as defined in claim 1, wherein the holder has a position regulator arranged around said displacement portion so as to come in contact with a surface of said slider when said slider is tilted with respect to said arm.

3. A floating magnetic head as defined in claim 1, wherein said projection extends from a middle of said displacement portion so as to contact with said arm.

4. A floating magnetic head having an arm which is movable in a radial direction of a disc, a slider which is attached to a top of said arm and which floats due to a movement of air produced by rotation of the disc, a magnet mounted on said slider, and a holder by which said slider is attached displaceably to said arm, comprising:
   a straddle-mounted spring displacement portion formed on said holder which is separate from said arm; and
   a projection extending from said arm so as to be in contact with the middle of said displacement portion, said projection providing a pivot for said displacement portion.

5. A floating magnetic head as defined in claim 4, wherein said holder has a position regulator extending around said displacement portion which comes into contact with the surface of said slider when said slider is tilted with respect to said arm.

6. A floating head arrangement comprising:
   an arm adapted for movement over a surface of a rotating disc;
   a displacement portion;
   a ring-shaped frame;
   first and second hinges interconnecting said displacement portion and said ring-shaped frame in a manner which permits the displacement portion to pivot about a first axis relative to said ring-shaped frame;
   first and second stabilizing pieces rigidly connected to a surface of said arm:
   third and fourth hinges interconnecting said ring-shaped frame with said first and second stabilizing pieces so as to permit the ring-shaped frame to pivot relative to said arm about a second axis which extends in a direction normal to the direction in which the first axis extends;
   a ring-shaped stabilizer structure which surrounds said ring-shaped frame in a spaced contact free relationship, said ring-shaped stabilizer structure being integrally connected with said first and second stabilizing pieces;
   a dimple-shaped embossed pivot provided to support a mid point of said displacement portion and to provide a fulcrum point about which the displacement portion is tiltable; and
   a slider rigidly connected with said displacement portion, said slider being arranged to extend beyond the displacement portion and to be engageable with said ring-shaped stabilizer structure when said ring-shaped frame rotates about the second axis by more than a predetermined amount.

7. A floating head arrangement as set forth in claim 6, wherein said dimple-shaped embossed pivot is integral with said displacement portion and is arranged to engage a surface of said arm.

8. A floating head arrangement as set forth in claim 6, wherein said dimple-shaped embossed pivot is integral with said arm and is arranged to engage a surface of said displacement portion which faces a surface of said arm in which the dimple-shaped embossed pivot is formed.

9. A floating head arrangement as set forth in claim 6, wherein said arm has an aperture, and wherein said dimple-shaped embossed pivot extends from a plate-shaped member which spans the aperture and is rigidly connected to said arm at its both ends.

10. A floating head arrangement as set forth in claim 6, wherein said arm is formed with an aperture, said displacement portion, said ring-shaped frame, said first and second hinges, said first and second stabilizing pieces, said third and fourth hinges, and said ring-shaped stabilizer structure are integral with said arm, and wherein a plate-shaped member, which is rigidly connected with the arm, spans the aperture, said dimple-shaped embossed pivot being formed on one of said displacement portion and the plate-shaped member and arranged to pivotally engage the other of said displacement portion and the plate-shaped member.

* * * * *